(No Model.)
J. W. HINE.
SHELF FASTENING.
No. 445,951. Patented Feb. 3, 1891.
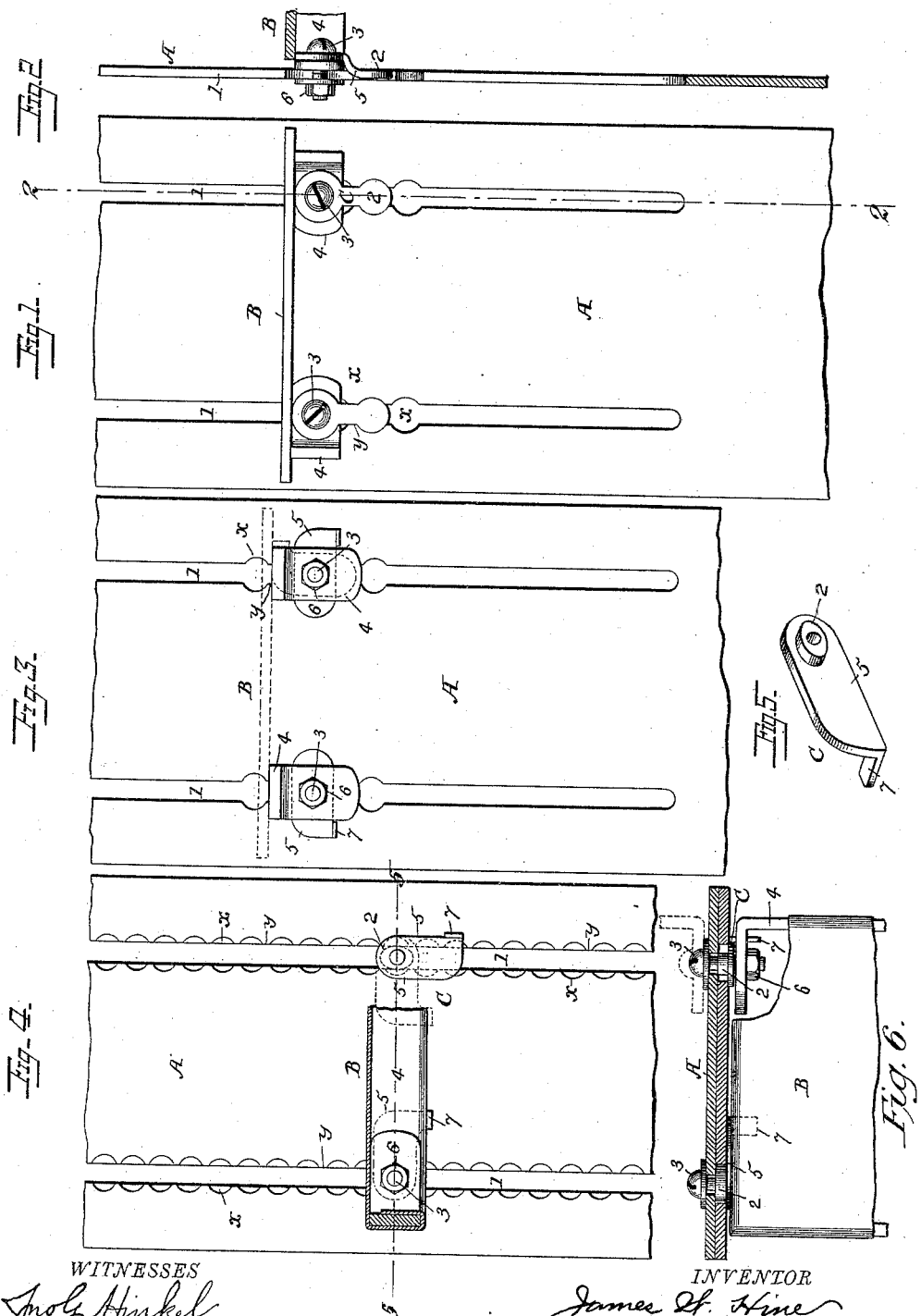
WITNESSES
Jno. G. Hinkel
H. S. McArthur
INVENTOR
James W. Hine
By Foster & Freeman
Attorneys

UNITED STATES PATENT OFFICE.

JAMES W. HINE, OF JAMESTOWN, NEW YORK, ASSIGNOR TO THE FENTON METALLIC MANUFACTURING COMPANY, OF SAME PLACE.

SHELF-FASTENING.

SPECIFICATION forming part of Letters Patent No. 445,951, dated February 3, 1891.

Application filed May 6, 1890. Serial No. 350,743. (No model.)

*To all whom it may concern:*

Be it known that I, JAMES W. HINE, a citizen of the United States, residing at Jamestown, Chautauqua county, New York, have invented certain new and useful Improvements in Shelf-Fastenings, of which the following is a specification.

It has now become common in storing public and other valuable records to make use of metallic casings to avoid danger from fire, and inasmuch as the books and other documents to be stored vary in size to a great extent, so that it is not practicable to make the casings with permanent shelves, except when specially constructed for a predetermined purpose, it is desirable to provide the casings with adjustable shelves and with temporary fastenings that will permit the shelves to be set to any desired position and then secured firmly in place without interfering with the ready readjustment when necessary.

My invention consists in means whereby the adjustable shelves may be temporarily locked in position, and as illustrated in the accompanying drawings, in which—

Figure 1 illustrates part of one side of a metallic casing, a shelf, and adjustable supports therefor. Fig. 2 is a section on the line 2 2, Fig. 1. Figs. 3 and 4 illustrate slight modifications of the supports. Fig. 5 is a perspective view of one of the locking devices. Fig. 6 is a section on the line 5, Fig. 4.

The cases are constructed in any of the usual ways with metallic side-pieces or partitions A, in each of which are two or more parallel slots 1 1, which serve as guides for the locking devices, which slots may extend through the sides or partitions, as shown, or they may be dovetailed grooves. The shelves B extend between the sides or partitions, and at the points at which the shelves are to be adjustable the slots 1 are enlarged at frequent intervals to form recesses $x$, wider than the slots, and intermediate shoulders $y$, and the shelf-supports are provided each with a locking device C, the head 2 of which is adapted to be introduced into the recesses $x$, to thereby hold the support in any position to which it may be set. The locking devices C and their heads 2 may be of different constructions while embodying my invention. In the construction shown in Figs. 1 and 2 the locking device consists of a plate having a head 2 at the end, circular in form, and adapted to be introduced laterally into the recesses, the plate being connected by a screw 3 with a bracket 4, constituting the support of the shelf B at one corner thereof. As shown, the screw 3 extends through the bracket 4 and through the slot 1, and carries a washer 5 and nut 6 at the opposite side of the side plate A, so that after the locking device has been set in place with its head 2 in one of the recesses $x$ the tightening of the nut 6 will bind all the parts together and prevent the head from moving from its position in the recess. When it is necessary to change the position of the shelf, each locking device is loosened by loosening the nut 6, the head 2 is drawn out of the recess, and the support or bracket 4 is then moved up or down to the proper position and there secured, as before. To avoid the necessity of manipulating the nuts 6 to such an extent, I prefer in many instances to place heads 2 upon the sides of the plates instead of the end, as shown in Figs. 3 to 6, said heads in such case being oval or elliptical, the major axis being equal to the width of the recesses $x$ and the minor axis to the width of the slot 1. The locking devices thus formed lie against the side plates A, and the brackets or supports 4 are confined thereto by screws 3, provided with nuts and washers at the opposite sides of the plates A, and when a shelf is to be adjusted the fastening device is turned to the position shown in Fig. 4, with the head 2 vertical, so as to slide readily up and down the slot 1, and when the proper point is reached the parts are secured in place by swinging the locking device to a horizontal position, thereby bringing the head across the slot in one of the recesses $x$, above the shoulders $y$. This construction permits the shelf to be readily readjusted without manipulating the nuts 6 or after simply loosening the same by simply swinging the locking device from a horizontal to a vertical position.

In the construction shown in Figs. 4 and 5 the recesses $x$ do not extend through the side plate A, but only through one section thereof, said plate being double.

When there are a series of shelves separated by partitions A, the bolt 3, connected with each locking device, will support a bracket 4 at each side of the partition, as shown in dotted lines, Fig. 5, one fastening device serving to lock both brackets or supports.

In Figs. 1, 2, and 3 the supports 4 are shown as disconnected from each other and adjustable separately. In Figs. 4 and 5 they are connected with the shelf 3, so as to move together with the latter; and in Figs 3 to 6 each locking device is shown as consisting of a plate having the head 2 at the side and a lift 7 at the opposite end which serves as a bearing against the bracket or support when the locking device is turned to a position to lock a support in its place.

Without limiting myself to the precise construction and arrangement of parts shown, I claim—

1. The combination, with the side plates or partitions, each having a series of recesses and shoulders, of the shelf-supports and locking devices connected to the shelf-supports and provided with heads adapted to the transverse diameters of the recesses, substantially as described.

2. A case having sides or partitions A, with vertical slots, recesses, and shoulders, movable shelves B and supports therefor, and locking devices, each having a head adapted to said recesses and adjustably connected to the support, substantially as set forth.

3. The combination, with the slotted and recessed sides or partitions A, of adjustable shelves and locking devices consisting of plates provided with elliptical heads adapted to said slots and recesses, said plate being constructed to rotate to engage and disengage the elliptic heads with the recesses, substantially as set forth.

4. The combination, with an adjustable shelf and with the slotted and recessed sides or partitions, of supports or brackets and plates pivotally connected with said supports or brackets, and each provided with an elliptical head extending into one of the slots and fitting within one of the recesses, substantially as set forth.

5. The combination, with the slotted and recessed plates and shelves and supports thereof, of locking devices provided with elliptical heads 2 and lips 7, for the purpose set forth.

In testimony whereof I have signed my name to this specification in the presence of two subscribing witnesses.

JAMES W. HINE.

Witnesses:
R. C. OMOHUNDRO,
CHARLES E. FOSTER.